United States Patent [19]

Mizuta et al.

[11] Patent Number: 5,323,595
[45] Date of Patent: Jun. 28, 1994

[54] STEEL TIRE CORD AND A TIRE INCORPORATING THE SAME

[75] Inventors: Takehiko Mizuta; Noriyuki Ozaki; Toshiaki Ito; Masao Shinmyo, all of Yamaguchi, Japan

[73] Assignee: Kokoku Steel Wire Ltd., Tokyo, Japan

[21] Appl. No.: 790,633

[22] Filed: Nov. 8, 1991

[30] Foreign Application Priority Data

May 16, 1991 [JP] Japan ................................. 3-111716
Jul. 19, 1991 [JP] Japan ................................. 3-179762

[51] Int. Cl.⁵ .............................................. D07B 1/06
[52] U.S. Cl. ......................................... 57/212; 57/311; 57/902
[58] Field of Search ................ 57/200, 212, 223, 215, 57/217, 311, 902

[56] References Cited

U.S. PATENT DOCUMENTS

| | | | |
|---|---|---|---|
| 4,022,009 | 5/1977 | van Assendelft | 57/902 X |
| 4,509,318 | 4/1985 | Yoneda | 57/902 X |
| 4,586,324 | 5/1986 | Mizuma | 57/902 X |
| 4,738,096 | 4/1988 | Hatakeyama et al. | 57/206 |
| 4,749,016 | 6/1988 | Kojima et al. | 57/902 X |
| 4,836,262 | 6/1989 | Nishizawa et al. | 57/902 X |

FOREIGN PATENT DOCUMENTS

| | | |
|---|---|---|
| 0462716A1 | 12/1991 | European Pat. Off. . |
| 1293015 | 4/1962 | France . |
| WO91/04370 | 4/1991 | PCT Int'l Appl. . |

Primary Examiner—Joseph J. Hail, III
Attorney, Agent, or Firm—Klauber & Jackson

[57] ABSTRACT

A steel tire cord is composed of three to five strands twisted closely with minimum gaps between the strands. The steel tire cord is easy to handle in embedding the same in rubber to form a tire, free from corrosion and highly durable. A tire incorporates the steel tire cords which are bonded firmly to rubber in a belt layer. Tires thus fabricated are uniform in quality and highly durable. The steel tire cord is composed of three to five twisted strands arranged in a construction reducing the sectional area of spaces in the steel tire cord to a minimum. The core strands twist in helices around imaginary cylinders having axes aligned with the axis of the steel tire cord. The outside strands twist in helices around imaginary cylinders having axes aligned with the axis of the steel tire cord and having diameters greater than those of the imaginary cylinders around which the core strands twist. At least one of the strands among the component strands of the steel tire cord is crimped to form bends therein. The core strands and the outside strands are arranged closely in a triangular sectional construction with gaps between the crimped strand and the adjacent strands. In the tire incorporating the steel tire cords, the outer enveloping surface of the steel tire cord, and inner enveloping surfaces defining the spaces having a triangular cross section are covered closely with rubber, so that the steel tire cords and the rubber are bonded firmly.

8 Claims, 2 Drawing Sheets

STEEL TIRE CORD AND A TIRE INCORPORATING THE SAME

DESCRIPTION

1. Technical Field

The present invention relates to a steel tire cord and a tire incorporating the same.

2. Background Art

Conventional steel tire cords are classified into closed cords as shown in FIG. 7A and open cords as shown in FIG. 7B.

DISCLOSURE OF THE INVENTION

The closed cored (FIG. 7C) as applied to a tire forms voids in the tire because the central space of the closed cored cannot be filled up with rubber in forming the tire. The voids in the tire allow local corrosion of the closed cord to propagate all over the tire.

The open cord (FIG. 7B) has a large central space because the component strands are strained excessively in manufacturing the same. The large central space of the open cord requires a large quantity of rubber to fill up the same and, in some cases, the large central space cannot fully be filled up with rubber. Furthermore, twists in the open cord are liable to be unstable. Since the elongation under a small load of the open cord is large, it is difficult to handle the open cord in fabricating a tire.

The central space may be reduced to the least by arranging the strands of the open cord in a triangular sectional construction, and the elongation may be reduced by employing a straight strand as one of the component strands. Although such a triangular sectional construction reduces the central space of the open cord to a minimum, the central space cannot fully be filled up with rubber because the component strands are arranged close to each other.

Test tire cords as shown in FIG. 7C were fabricated. In each of the test tire cords, some of the strands were crimped to form spaces between the adjacent strands.

In impregnating the test tire cords with rubber, rubber was able to penetrate through gaps between the adjacent strands to the central spaces, and the central spaces of the test tire cords were filled up satisfactorily with rubber, eliminating the possibility of corrosion and problems attributable to elongation.

However, some of the strands of some of the test tire cords were broken. The examination of the broken strands proved that all the broken strands were straight strands, which is inferred to be due to the concentration of tensile load on the straight strands.

Although many other steel tire cords have been proposed, none of them are free from all the problems relating to corrosion, elongation under a low load and the breakage of the component strands. Since the twists inserted in steel tire cords are not stabilized, the topping process in manufacturing a tire is difficult and costly, and the belt layers are liable to differ in quality from each other. Furthermore, tensile stress is induced only in one or two of the component strands of the tire cord and hence these strands tend to be broken in a very short working time, which deteriorates the durability of the tire cord.

The present invention is intended to solve problems in the steel tire cord attributable to the central space having a large sectional area, the large elongation and unstable twists and the concentration of tensile load on only some of the component strands, and problems in the tire attributable to the bonding of steel tire cords and rubber in a belt layer, quality or durability.

To solve the foregoing problems, the present invention provides a steel tire cord composed of three to five strands and having a sectional construction in which the sectional area of spaces between the strands is reduced to a minimum possible value; characterized in that the axis of the core strand and that of the outside strand twist around the axis of the cord, the diameter of an imaginary cylinder around which the axis of the core strand twist is smaller than those of imaginary cylinders around which the axes of the outside strands twist, respectively, the core strand and the outside strands are different from each other in helix angle, and at least one of the component strands is crimped.

Concretely, the cord is composed of three to five strands including one or two core strands and two to four outside strands twisting around the core strands. The axes of the core strands twist around the axis of the cord in smaller helices, and the axes of the outside strands twist around the axis of the cord in larger helices. One of the core strands and the outside strands is crimped. In a cross section of the cord, the adjacent core strands and the outside strands are arranged closely in a triangular sectional construction, and gaps are formed between the crimped strand and the adjacent strands.

To solve the foregoing problems, the present invention provides a tire having a belt layer incorporating steel tire cords each composed of three to five strands including one or two core strands and two to four outside strands twisting around the axis of the cord in helices, characterized in that the axes of the core strands twist around the axis of the cord in smaller helices, the axes of the outside strands twist around the axis of the cord in larger helices, one of the core strands and the outside strands is crimped, the adjacent core strands and the outside strands are arranged closely in a triangular sectional construction, gaps are formed between the crimped strand and the adjacent strands, and an enveloping surface enveloping the cord and an enveloping surface having a triangular cross section enveloping inside from the spaces are covered closely with rubber and integrally embedded.

The crimped strands may be the core strands and the outside strands, the outside strands or the core strands.

The difference in the diameter of the imaginary cylinder between the core strands and the outside strands is determined selectively taking into consideration the correlation between breakage and elongation. The diameters of the imaginary cylinders around which the outside strands twist are greater than those of the imaginary cylinders around which the core strands twist. The difference in the diameter of the imaginary cylinder around which the outside strands twist is dependent on the sectional construction of the cord.

The pitch of the bends in the crimped strand is 10 to 50 times the diameter of the strand, and the diameter of the strand is in the range of 0.15 to 0.38 mm. The pitch and the diameter are determined selectively taking into consideration particulars relating with the tire. When the plurality of strands are crimped, the bends in the strands may be dislocated from or coincide with each other with respect to the direction of the axis of the cord.

EFFECT OF THE INVENTION

1. Since the axes of the core strands and the outside strands twist around imaginary cylinders concentric with respect to the axis of the cord, the core strands twist in smaller helices while the outside strands twist in larger helices, the core strands and the outside strands are arranged closely in a triangular sectional construction, and gaps are formed between the crimped strands and the adjacent strands, the sectional area of the spaces in the cord is reduced to a minimum even though the cord is composed of the three to five strands, and tensile load is distributed to all the strands. Accordingly, the quantity of rubber necessary for filling up the spaces in the cord is reduced, the gaps between the crimped strands and the adjacent strands through which rubber penetrates the cord need not be large, and rubber is able to penetrate the cord through the small gaps to fill up the spaces completely.

2. Although the steel tire cord has a small initial elongation and the twists are stabilized, the spaces of a minimum sectional area can be filled up with rubber.

3. Since the small initial elongation and the stabilized twists facilitates handling the steel tire cord in embedding the steel tire cord in rubber in fabricating a tire and any particular strand is not broken because tensile load is distributed to all the strands.

4. Since the spaces having a minimum sectional area and having a triangular cross section in the cord embedded in the belt layer are filled up completely with rubber, the corrosion of the cord can be prevented, and the outer and inner enveloping surfaces of the cord, and the rubber maintain a strong bonded state to provide a highly durable cord because the rubber is in close contact with the outer enveloping surface of the cord, the spaces, and the enveloping surface having a triangular cross section communicating with the spaces.

5. Since the core strands and the outside strands of the cord embedded in the belt layer twist around the axis of the cord in helices around imaginary cylinders of different diameters, respectively, and bonded by rubber, any particular strand is not subjected to tensile load, any particular strands are not broken, all the strands are able to exhibit strength nearly equal to their inherent strength, and the cord has high durability.

6. Since the bonding strength bonding the cord and rubber in the rubber layer is very high, the cords are uniform in quality.

7. The stabilized twists and the small initial elongation of the cord embedded in the rubber layer facilitates and improves the economic effect of the topping process.

BEST MODE FOR CARRYING OUT THE INVENTION

Figure 1:
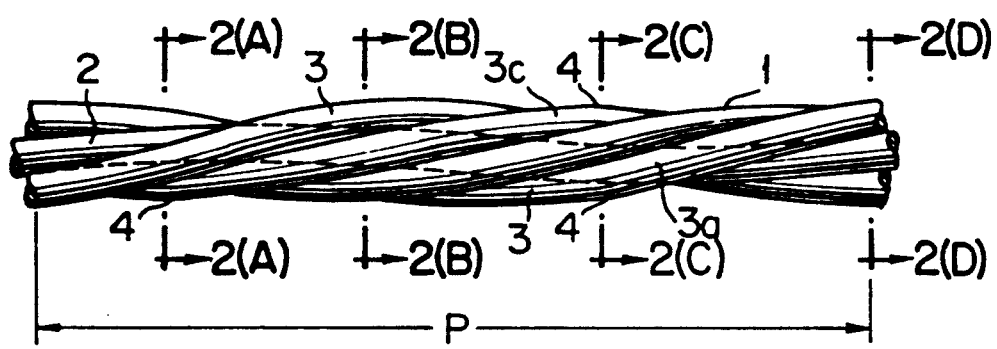
FIG. 1 is a fragmentary front view of a steel tire cord in a first embodiment according to the present invention.
Figure 2A:
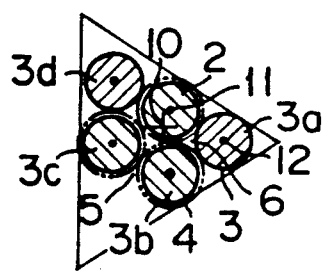
FIG. 2A is an enlarged sectional view taken on line A—A in FIG. 1.
Figure 2B:
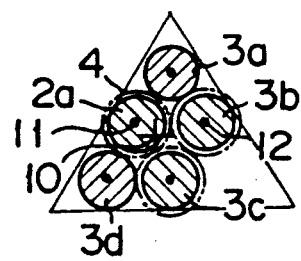
FIG. 2B is an enlarged sectional view taken on line B—B in FIG. 1.
Figure 2C:
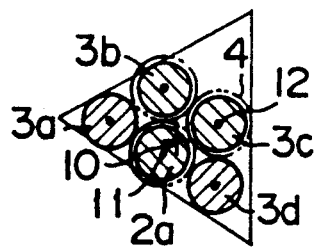
FIG. 2C is an enlarged sectional view taken on line C—C in FIG. 1.
Figure 2D:
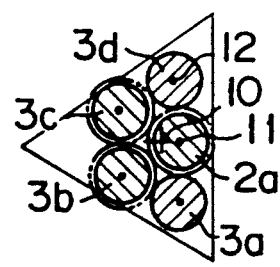
FIG. 2D is an enlarged sectional View taken on line D—D in FIG. 1.

Preferred embodiments of the present invention will be described hereinafter with reference to the accompanying drawings. Referring to the drawings, a steel cord 1 is composed of three to five strands including one or two core strands 2 and the rest of the strands as outside strands 3. The axis 11 of the core strand 2 twists around the axis 10 of the steel cord 1, and the axes of the outside strands 3 twist around the axis 11 of the steel cord 1. The diameter of a cylinder around which the axis 11 of the core strand 2 twist is smaller than those of cylinders around which the outside strands 3 twist, respectively. The steel cord 1 is twisted so that each core strand 2 and the outside strands 3 are arranged closely to define a triangular sectional construction, as shown in dotted lines in the drawings. Some of the core strand 2 and the outside strands 3 are crimped strands having bends 4. Gaps 5 are formed between the crimped strands and the adjacent strands.

Figure 3:
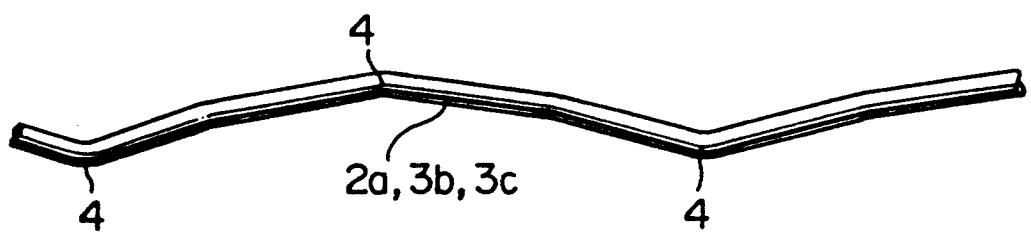
FIG. 3 is a fragmentary reduced front view of a crimped strand.

More concretely, in the steel cord 1 shown in FIGS. 1 to 3, the axis 11 of the core strand 2a twists around the axis 10 of the steel cord 1, and the core strand 2a is crimped to form the bends 4. The axes 12 of the outside strands 3, i.e., the outside strands 3a to 3d, twist around the axis 11 of the steel cord 1. The diameter of a cylinder around which the axis 11 of the core strand 2a twist is smaller than those of cylinders around which the axes of the outside strands 3 twist. The outside strands 3b and 3c among the outside strands 3 are crimped and have bends 4.

The steel cord 1 is twisted so that the core strand 2 and the outside strands 3 are arranged closely in a triangular sectional construction, forming the gaps 5 between the crimped strands and the adjacent strands. Three spaces 6 are formed around the core strand 2. The spaces 6 communicate with the outside by means of the gaps 5

Each space 6 communicates with outside by means of the two or more gaps 5, so that rubber can efficiently penetrate through the gaps 5 to the spaces 6 to fill up the spaces 6 perfectly.

Although the two outside strands are crimped and the two other outside strands are not crimped in this embodiment, either one of the outside strands or the three outside strand may be crimped strands. The arrangement of the outside strands including the crimped outside strands is optional.

Figure 4:
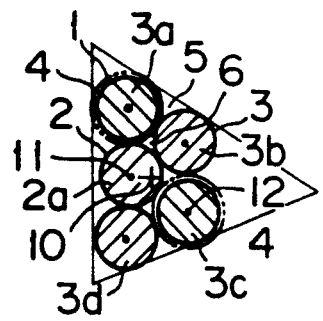
FIG. 4 is an enlarged sectional view of a steel tire cord in a second embodiment according to the present invention.

A steel cord 1 shown in FIG. 4 is composed of a core strand 2 having an axis 11 twisting around the axis 10 of the steel cord 1, and four outside strands 3 each having an axis 12 twisting around the axis 10 of the steel cord 1. The diameter of a cylinder around which the core strand 2 twists is smaller than those of cylinders around which the outside strands 3 twist, respectively. The two outside strands 3a and 3c among the four outside strands 3a to 3d are crimped and have bends 4.

The core strand 2 and the outside strands 3, i.e., the outside strands 3a to 3d, are arranged in a triangular sectional construction with spaces between the crimped outside strands 3a and 3c, and the adjacent strands.

In a modification, all the outside strands 3 may be crimped strands having bends.

Figure 5:
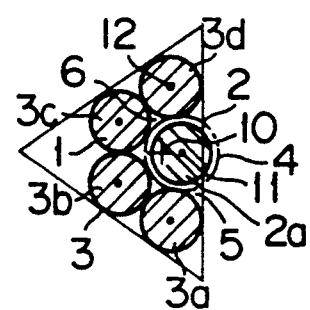
FIG. 5 is an enlarged sectional view of a steel tire cord in a third embodiment according to the present invention.

A steel cord 1 shown in FIG. 5 is composed of a core strand 2, i.e., a crimped core strand 2a having bends 4, having an axis twisting around the axis 10 of the steel cord 1, and outside strands 3, i.e., four outside strands 3a to 3d, each having an axis twisting around the axis 10 of the steel cord 1. The diameter of a cylinder around which the core strand 2a twist is smaller than those of cylinders around which the outside strands 3a to 3d twist, respectively.

The core strand 2a and the outside strands 3a to 3d are twisted closely with gaps 5 between the adjacent strands in a triangular sectional construction. Three spaces 6 formed between the core strand 2 and the outside strands 3 communicate with the outside by means of the gaps 5.

In the foregoing embodiments, the gaps 5 are connected to the spaces 6 of the cord 1, and rubber is able to penetrate through the gaps 5 to the corresponding spaces 6 to fill up the spaces 6.

Table 1 shows the results of comparative examination of a steel tire cord in accordance with the present invention and conventional steel tire cords in terms of low-load elongation (0 to 5 kg) and filling ratio. The steel cords are five-ply cords having a diameter of 0.25. In Table 1, values of particulars specified by asterisks are represented by ratios of the values to the corresponding values for the closed cord.

As is obvious from Table 1, the steel cord in accordance with the present invention has a small low-load elongation approximately equal to that of the closed cord and has a large space filling ratio of 100% equal to that for the open cord. The open cord and the closed cord have both advantages and disadvantages.

TABLE 1

Figure 7A:
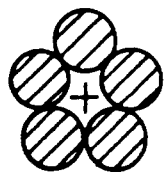
FIG. 7A is an enlarged sectional view of a conventional closed cord.
Figure 7B:
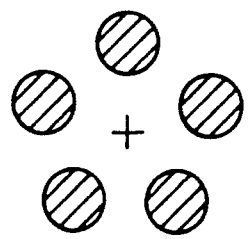
FIG. 7B is an enlarged sectional view of a conventional open cord.
Figure 7C:
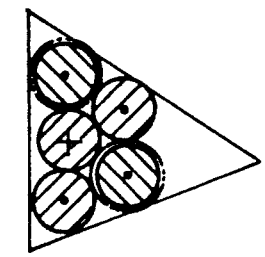
FIG. 7C is an enlarged sectional view of a test steel tire cord.

|  | Invention | Conventional cords | | |
| --- | --- | --- | --- | --- |
|  | Sample cord | Closed type | Open type | Test cord |
| Sectional shape | FIG. 1 | FIG. 7A | FIG. 7B | FIG. 7C |
| Diameter* | 1.08 | 1.00 | 1.25 | 1.08 |
| Breaking strength* | 0.99 | 1.00 | 0.98 | 0.70 |
| Elongation* (0 to 5 KG) | 1.33 | 1.00 | 5.00 | 1.00 |
| Filling ratio (%) | 100 | 0 | 100 | 100 |
| Pitch of bends | 20d | — | 1' | 20d |

TABLE 1-continued

|  | Invention | Conventional cords | | |
| --- | --- | --- | --- | --- |
|  | Sample cord | Closed type | Open type | Test cord |

Figure 6:
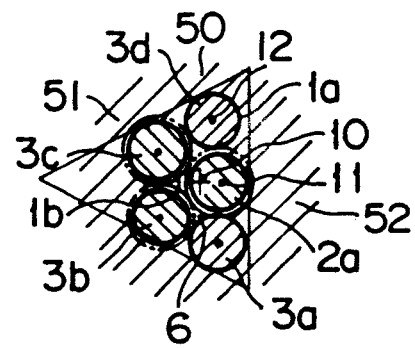
FIG. 6 is a fragmentary enlarged sectional view of a portion of a tire in a preferred embodiment according to the present invention incorporating steel tire cords as shown in FIG. 1.

FIG. 6 shows a portion of a tire 50 in an enlarged view. The tire 50 is formed in a desired shape and has a belt layer 51 incorporating steel cords 1, which is similar to the steel cord in the first embodiment according to the present invention shown in FIG. 1, embedded therein. In FIG. 6, only one of the steel cords 1 is shown. The description of the steel cords 1 will be omitted to avoid duplication.

The steel cord 1 embedded in the belt layer 51 is surrounded closely by rubber 52 extending along an enveloping surface 1a enveloping the steel cord 1. The inner spaces 6 having a triangular cross section are filled up with the rubber penetrated through the gaps 5 thereto and extending along inner enveloping surfaces 1b. Thus, the steel cord 1 is impregnated perfectly with the rubber 52, and the steel cord 1 and the rubber 52 are bonded together in the belt layer 51.

We claim:

1. A steel tire cord consisting essentially of five strands, including one core strand, and four outside strands, twisting around the core strand; characterized in that the core strand twists in a helix around an imaginary cylinder having an axis aligned with the axis of the steel tire cord, each of the outside strands twists in a helix around a respective imaginary cylinder having an axis aligned with the axis of the steel tire cord, the diameters of the imaginary cylinders around which the outside strands twist are greater than that of the imaginary cylinder around which the core strand twists; wherein at least one of the core strand, and the outside strands is crimped to form bends therein; and wherein the core strand, and the outside strands are arranged closely in a configuration which defines a cross sectional construction of adjacent rows of two strands and three strands, wherein the core strand is directly adjacent each of the outside strands, and with gaps between the crimped strand or strands, and the strands adjacent thereto.

2. A steel tire cord according to claim 1, wherein the core strand is crimped to form bends therein.

3. A steel tire cord according to claim 1, wherein the outside strands are crimped to form bends therein.

4. A steel tire cord according to claim 1, wherein the core strand, and the outside strands are crimped to form bends therein.

5. A tire having a belt layer reinforced by steel tire cords embedded therein, characterized in that each steel tire cord is composed of the steel tire cord of claim 1, and wherein each of said steel tire cords, and said core and outer strands, is embedded in rubber.

6. A tire according to claim 5, wherein the core strand is crimped.

7. A tire according to claim 5, wherein the outside strands are crimped to form bends therein.

8. A tire according to claim 5, wherein the core strand, and the outside strands are crimped to form bends therein.

* * * * *